United States Patent

[11] 3,579,073

| [72] | Inventors | Richard Johnstone<br>2400 Rockway Lane E., Brookfield, Wis. 53005;<br>Richard E. Stobbe, 4221 S. 104th St., Greenfield, Wis. 53228 |
|---|---|---|
| [21] | Appl. No. | 37,485 |
| [22] | Filed | May 20, 1970 |
| [45] | Patented | May 18, 1971<br>Continuation-in-part of application Ser. No. 726,964, May 6, 1968. |

[54] SPINDLE GROWTH COMPENSATOR
7 Claims, 5 Drawing Figs.

[52] U.S. Cl. .................................................. 318/634, 318/473
[51] Int. Cl. .................................................. G05d 23/275
[50] Field of Search .......................................... 318/634, 473

[56] References Cited
UNITED STATES PATENTS

| 2,776,397 | 1/1957 | McWilliams .................. | 318/632X |
| 3,164,759 | 1/1965 | Connors et al. ............... | 318/632X |
| 3,347,116 | 10/1965 | Anderson et al. .............. | 318/632X |
| 3,358,201 | 12/1967 | Jones .......................... | 318/632X |
| 3,393,588 | 7/1968 | Broome ....................... | 318/632X |

*Primary Examiner*—Benjamin Dobeck
*Attorneys*—Thomas A. Hauke, Donald E. Porter, Cyril M. Hajewski, William C. Gleisner and Robert C. Jones

ABSTRACT: A device for automatically compensating for the expansion and contraction of the spindle of a machine tool due to different operating temperatures. A thermistor, impedance network is utilized to provide a corrective predetermined control signal to the spindle positioning control circuit.

Patented May 18, 1971

INVENTOR
RICHARD JOHNSTONE
RICHARD STOBBE
ATTORNEY
Robert C. Jones

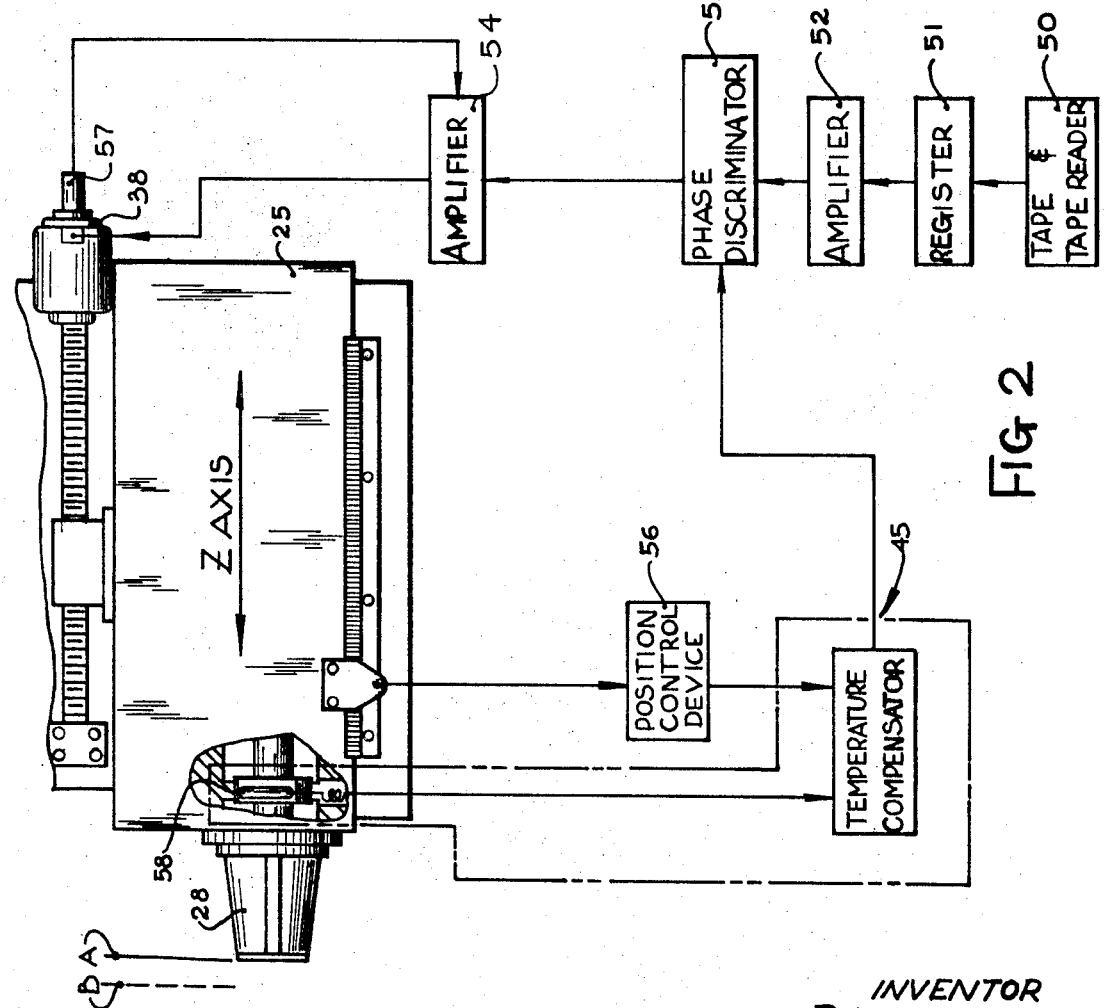

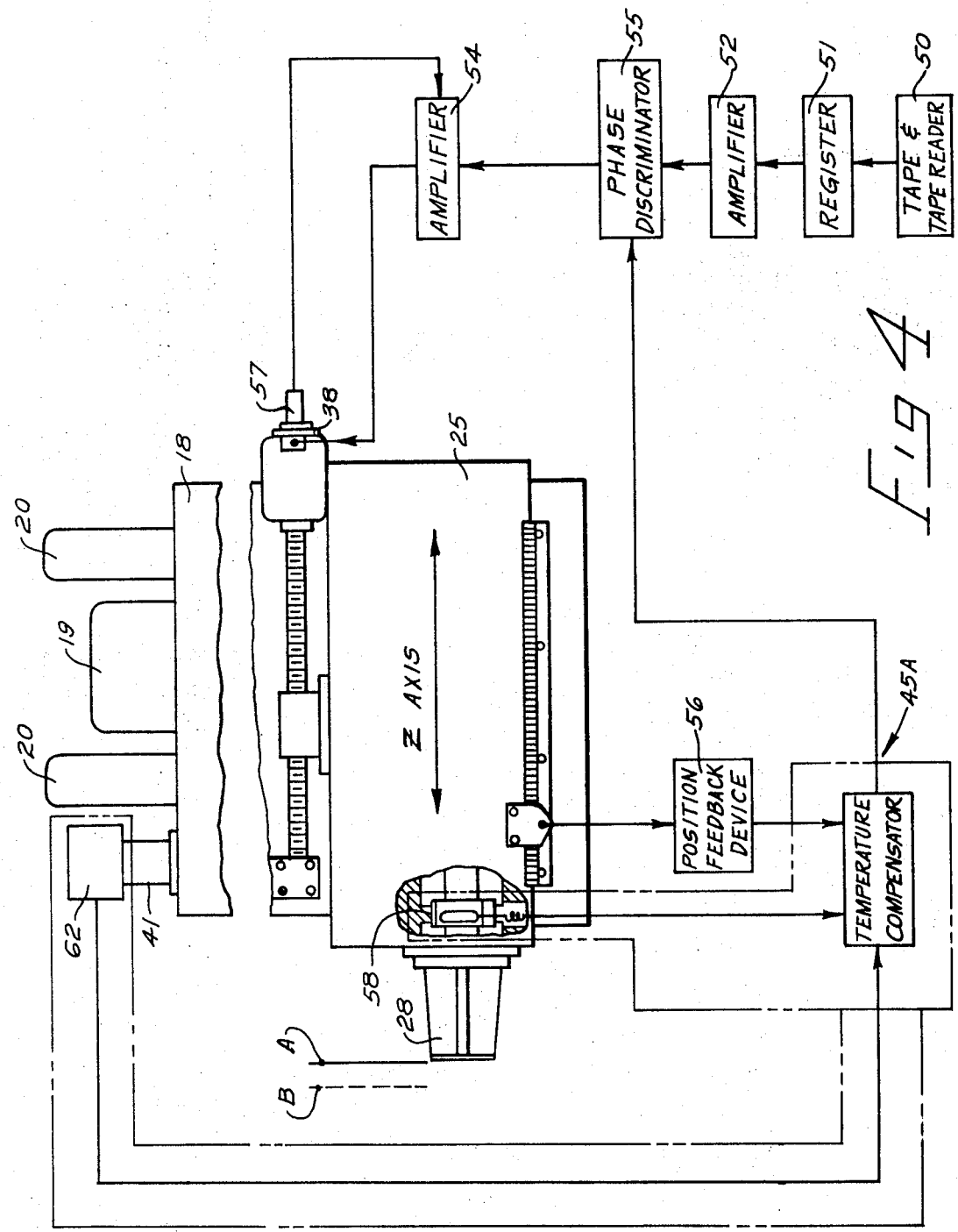

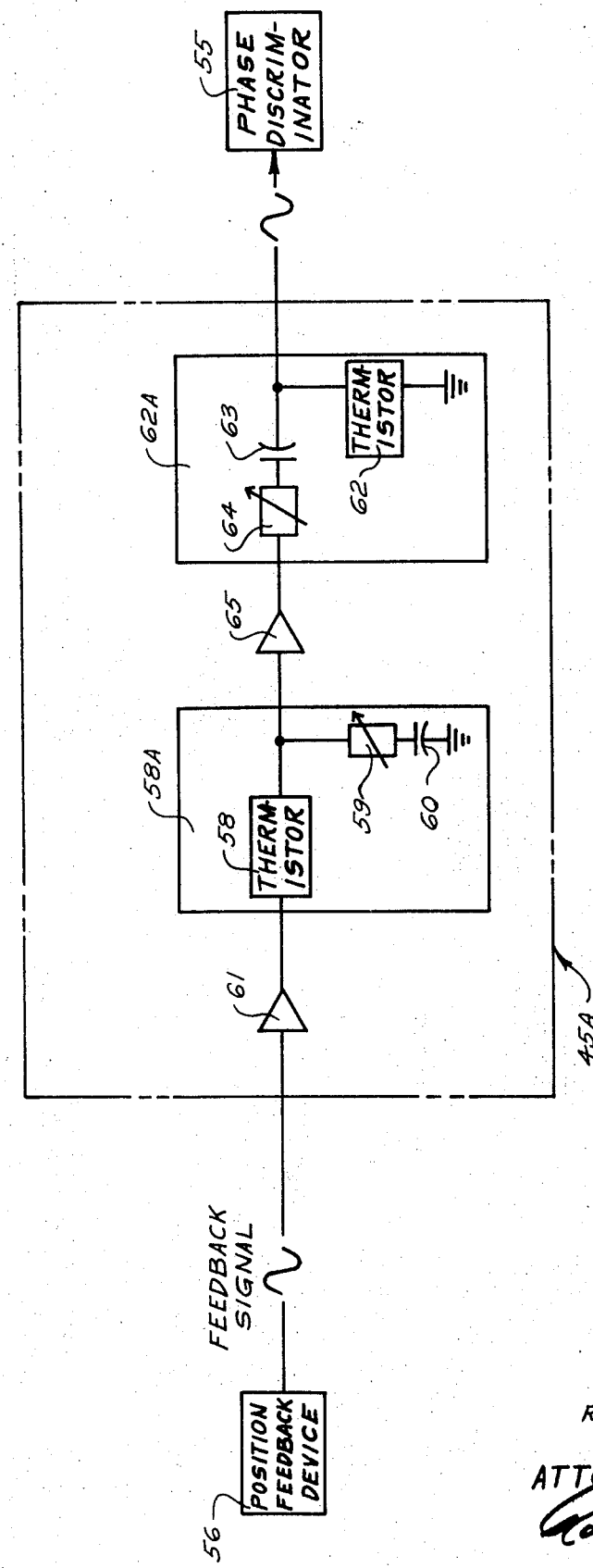

SPINDLE GROWTH COMPENSATOR

The present application comprises a continuation-in-part of the Johnstone-Stobbe application, Ser. No. 726,964, filed May 6, 1968, for SPINDLE GROWTH COMPENSATOR.

BACKGROUND OF THE INVENTION

The present invention relates generally to precision positioning systems and more particularly to a device which is automatically operable to apply a correction factor to the positioning system of the machine tool spindle to compensate for any linear contraction or expansion in the machine structure due to changes in operating temperatures.

SUMMARY OF THE INVENTION

According to this invention, there is provided a device to be used in a machine tool spindle positioning control system which will automatically correct for dimensional changes in the machine structure due to changes induced into the structure by operating temperature changes. A position feedback unit supplies a sine wave to a temperature compensator which utilizes a thermistor, resistor and capacitor network to change the phase angle of the sine wave. The temperature compensator will change the phase of the sine wave coming from the position feedback unit so as to compensate for any linear dimensional changes of the machine structure and spindle due to changes in operating temperatures. The thermistor in the temperature compensator is a temperature sensitive variable resistance transducer having a negative coefficient of resistivity. The output control voltage from the temperature compensator is fed into a phase discriminator. The phase discriminator operates to compare the control voltage from the temperature compensator, which indicates the temperature corrected position of the spindle, with a command input voltage, that originates from the data input equipment, and the net or error voltage is then utilized to operate a motor control to actuate a motor in a positioning action. When the phase of the command voltage and the phase of the control voltage are in correspondence, a null occurs and the operation of the motor will stop and the positioning of the spindle will have been effected as directed by the command input.

In a modification of the temperature compensator above, there is provided a temperature compensating network which will compensate for changes in operating temperature of the machine structure above the ambient temperature of the surroundings. To do this a second thermistor, resistor, capacitor network is used to change the phase of the sine wave coming from the position feedback unit in a direction opposite to that of the first thermistor, resistor, capacitor network. The thermistor in the second thermistor, resistor, capacitor network is located to measure any change in ambient temperature. Therefore a differential correction signal will be supplied from the temperature compensator to the phase discriminator, that signal will compensate for the linear dimensional changes of the machine structure and spindle due to changes in operating temperatures of the machine structure above the ambient temperature of the surroundings.

BRIEF DESCRIPTION OF THE DRAWINGS

FIG. 2 is a general block schematic showing the basic components present in a spindle positioning control system embodying the features of the invention;

FIG. 3 is a schematic illustrating the components that make up the temperature compensating network shown in FIG. 2;

FIG. 4 is a general block schematic showing a modified spindle positioning control system; and, FIG. 5 is a schematic illustrating the components that make up the temperature compensating network shown in FIG. 4.

DESCRIPTION OF THE PREFERRED EMBODIMENT

Figure 1:
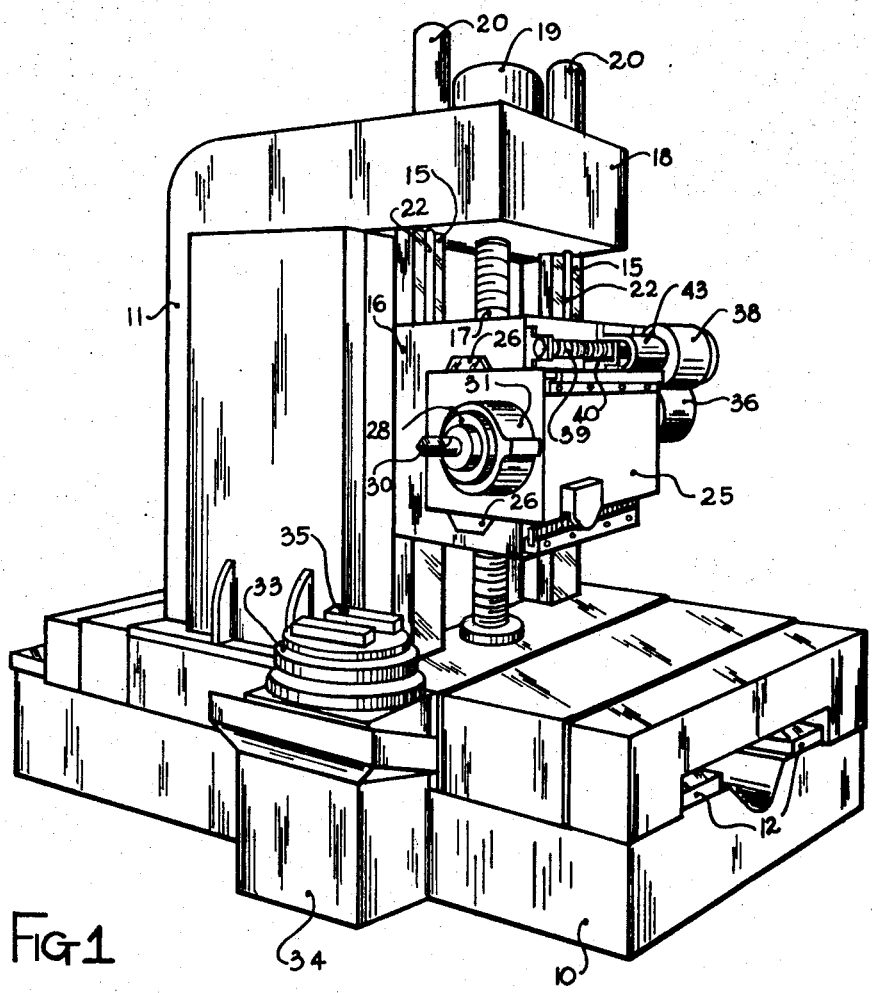
FIG. 1 is a perspective view of a machine tool incorporating the features of the present invention.

Reference is now made more particularly to the drawings and specifically to FIG. 1, thereof, illustrating a machine tool incorporating the features of the present invention. The machine generally comprises a bed 10 which slidably supports an upstanding column 11. To this end, the bed 10 is provided with horizontal ways 12, which are engaged by complementary ways, not shown, formed on the bottom of column 11 to support the column for sliding movement along the length of the bed 10. The column 11 is provided with vertical ways 15 for engagement by complementary ways, not shown, formed on a saddle 16 for slidably supporting the saddle in a vertical path of travel. Vertical movement of the saddle 16 in either direction is effected by rotating a screw 17 which is in threaded engagement with a nut, not shown, that is fixed to the saddle 16. The screw 17 is rotatively supported by the column 11, being journaled at its upper end in a cap 18 that is secured to the top of the column 11 and which extends from the column beyond the ways 15 for receiving the screw 17. The lower end of the screw 17 is journaled in a suitable bearing, not shown, that is attached to the column 11 beneath the top of the bed 10. The screw 17 may be rotated in either direction by a motor 19 mounted on the top of the cap 18 and connected to rotate the screw 17 for actuating the saddle 16 in its path of travel by power. A pair of hydraulic piston and cylinder mechanisms 20 are mounted on the top of the cap 18 and are connected to the saddle 16 by connecting rods 22 and are arranged in a well-known manner to counterbalance the weight of the saddle 16 and its associated mechanisms.

A spindle head 25 is carried by the saddle 16 and is provided with horizontal ways 26 which engage complementary ways formed within the saddle 16 for supporting the spindle head 25 for a sliding cross-feeding movement in a horizontal path transverse to the direction of travel of the column 11. It is therefore apparent that the column 11, the saddle 16 and the spindle head 25 are each supported for movement in three mutually transverse paths of travel. The spindle head 25 rotatably supports a spindle 28 that is adapted to carry a tool 30 to rotate with the spindle 28 for performing a work operation. The spindle 28 is rotatably supported in a housing 31 that is horizontally mounted within the spindle head 25.

The spindle 28 supports the tool 30 in position to operate upon a workpiece, not shown, located on a rotary index table 33 which is mounted on the top of a pedestal 34 that is secured to the front face of the bed 10. In the illustrated embodiment, the rotary table 33 is adapted to receive the workpieces attached to pallets, not shown, which are transported to the table 33 onto a pair of rails 35 by a suitable conveyor, not shown, and clamped to the rails so that a workpiece carried by the pallet will be positioned relative to the saddle and spindle head in position for the spindle head to be moved or adjusted to a desired position relative to the workpiece. However, it is to be understood that any conventional table may be provided with each individual workpiece being clamped thereto manually by the operator if so desired.

The spindle 28 is driven in its rotary movement by a motor 36 under the control of a servo mechanism, not shown, that is controlled automatically from recorded data or by manual manipulation of the electrical control system. The motor 36 is connected to drive the spindle 28 through a transmission, not shown, in a well-known manner.

Cross-feeding movement of the spindle head 25 for effecting the feeding movement of the spindle 28 toward or away from the workpiece or to effect the position of the spindle relative to the workpiece is effected by a motor 38 which is energized through a motor control unit that may be operated automatically in response to recorded data or by the manual manipulation of the electrical control circuit for controlling the rate and direction of rotation of the crossfeed motor 38 to regulate the rate and direction of movement of the spindle head 25. The motor 38 is operably connected to rotate a screw 39 that is journaled in a recirculating ball bearing threaded nut 40 which is secured to the spindle head 25. The ends of the lead screw 39 are anchored in a pair of preloaded bearing brackets 42, one which is shown, that are attached to the saddle 16. A cover 43 is secured to the saddle and is formed to enclose the screw 39 and the nut 40 so as to exclude foreign matter from the screw and nut mechanism to avoid impairing its efficiency.

When the machine tool spindle is rotated, its temperature may rise substantially as a result of the heat that is generated by the friction that develops in the various mechanical components of the machine tool spindle head, such as the bearings, gears and the motor. Such temperature variation results in an expansion and contraction in the length of the spindle structure by reason of its coefficient of expansion. This expansion and contraction operates to displace the tool carrying end of the spindle from the established position. In machine tools in which relative positioning between the tool carrying spindle and a workpiece is effected automatically, the positioning movement is made with respect to an established reference plane. Thus, a precise relationship may be established between the workpiece and the tool carrying spindle. However, if the operating end or tool carrying end of the spindle is displaced from an established position by reason of its expansion or contraction, an error is introduced which is detrimental in automatic high precision types of work operations.

For example, it may be assumed that a tool carrying spindle is to be positioned relative to a workpiece by movement of the spindle head and such movement will be effected automatically by means of a positioning control system associated with the spindle head. The command information to the positioning control system to effect a movement of the spindle head is always related to a reference plane so that the exact position of the spindle head at any particular time is established in relation to this reference plane. Therefore, if the spindle head is moved a distance which is x number of inches from an established reference plane, the operating end or tool carrying end of the spindle will be located in a plane A. However, if due to temperature variation in the spindle head structure the spindle has expanded, the operating end of the spindle will not be in the desired plane A but will actually be in a plane B which is a distance closer to the workpiece by an amount equal to the displacement of the operating end of the spindle by reason of its linear expansion as a result of the temperature rise. In this case, the work operation performed on the workpiece would be in error in an amount equal to the distance between the desired plane A and the actual plane B. In order to compensate for the displacement of the operating end of the spindle from an established position due to temperature variation, a temperature compensating device generally identified by the reference numeral 45 is inserted in the spindle position control circuit, as shown in FIG. 2.

As shown in FIG. 3, the temperature compensator 45 comprises a thermistor 58 connected to an adjustable resistor 59 and capacitor 60. The thermistor 58 is a semiconductor device that changes resistance as a function of temperature. As the temperature increases the resistance of a thermistor decreases; therefore, a thermistor has a negative coefficient of resistivity.

As illustrated in the block diagram of FIG. 2, the function of the control system is to control the lateral (Z-axis) movement of the spindle automatically in response to numerical data as read by the data input tape reader 50. The tape reader 50 produces a signal which indicates the desired position of the machine tool spindle 28 and this signal is transmitted to a Z-axis register 51 where it is stored and converted into a command voltage for indicating the final position of the spindle 28. Amplification of the command voltage signal obtained from the register is effected by a voltage amplifier 52 and fed into a phase discriminator 55. The phase discriminator 55 operates to compare the command input voltage with a control voltage which originates from a position feedback unit 56 and a temperature compensator 45. A resulting net error voltage is directed through an amplifier 54 to the spindle slide motor 38 and utilized to effect the operation of the motor 38 in a positioning action. A tachometer 57 is associated with the motor 38 to produce a voltage corresponding to its velocity. When the phase of the command voltage and the phase of the control voltage are in correspondence, a null is obtained and the operation of the spindle slide motor 38 will stop and the positioning of the slide will have been effected as directed by the command input or tape.

The position feedback device 56, shown in FIG. 2, can be of a bridge network type as shown and described in U.S. Pat. No. 3,010,063 issued to to J. M. Rhoades, on Nov. 21, 1961, or of a Selsyn type, both of which are well-known in the art. Both types of feedback devices supply a sine wave output which is indicative of the relative position of the spindle 28. The sine wave output of the position feedback unit 56 is fed to the temperature compensator 45. The thermistor element 58, as schematically indicated in FIG. 2, is physically located in the front spindle bearing of spindle 28 and its resistance will change as the temperature changes. The thermistor 58 is used with a capacitor 60 to change the phase of the sine wave coming from the position feedback unit 56. The adjustable resistor 59 determines the amount of phase change for a certain resistance change in the thermistor.

In a preferred embodiment, the position feedback unit 56 represents one-tenth of an inch of spindle linear travel for every 360° of phase shift in the control voltage. The magnitude of spindle expansion anticipated, due to temperature variation, is assumed to be anywhere from one to ten thousandths of an inch. Thus, a temperature compensator that operates to change the phase angle of the control voltage coming from the positioning feedback unit 36° will be satisfactory. The combination of the capacitor 60, thermistor 58 and adjustable resistor 59, as shown in FIG. 3, has sufficient phase shift capabilities to effect the desired 36° phase shift. The temperature compensator 45 will be set to compensate for linear dimensional changes of the machine structure due to the changes of operating temperatures. To set the temperature compensator, the tap of the adjustable resistor 59 is set at an arbitrary point and the spindle 28 then runs at a low operating speed. The linear distance between the spindle 28 and a reference point located on a workpiece secured to the table 33 is then measured. Thereafter, the spindle 28 is operated at a higher speed which will generate higher operating temperatures which, in turn, effects the thermal expansion of the spindle head structure and column structure. The distance between the spindle nose and the initial reference point located on the workpiece is now measured, and the adjustable resistor 59 will be adjusted accordingly. If it is found that the temperature compensator effects too much of a phase change in the control voltage coming from the position feedback unit 56, thereby causing the spindle to stop short of the desired position, the tap on the adjustable resistor will be moved to put more resistance in. On the other hand, if it is found that the temperature compensator effects too little of a phase change in the control voltage coming from the position feedback unit 56, thereby causing the spindle to overtravel the desired position, the tap on the adjustable resistor will be moved to short cut more of the resistance. By running the spindle 28 at its different speeds and by taking linear measurements between the spindle and some reference point, as described above, an optimum setting for the adjustable resistor 59 may be obtained.

In FIG. 4, there is represented a modification of the invention in which a second thermistor 62 is used in the temperature compensator 45A. Thermistor 58 is physically located adjacent to the forward spindle bearing of spindle 28 and is used to measure the change in operating temperature of the machine structure. Thermistor 62, which is used to measure the ambient temperature of the surroundings, is physically mounted on a bracket 41, which is in turn secured to the machine cap 18. Bracket 41 should be made of an insulating material so as not to conduct heat from the machine cap 18 to the ambient measuring thermistor 62. It is understood that the placement of the operating and ambient measuring thermistors is governed by the particular machine and its surroundings and therefore should be placed to give the optimum results.

As shown in FIG. 5, the signal from the position feedback unit is fed into an amplifier 61. The amplified signal is fed into a thermistor 58, resistor 59, and capacitor 60 network, which changes the phase of the amplified signal in a direction to compensate for the linear dimensional changes of the machine structure and spindle due to changes in operating temperatures. The adjustable resistor 59 determines the amount of phase change for a certain resistance change in the thermistor 58. The output of the thermistor 58, resistor 59 and capacitor 60 of the network 58A is fed into an amplifier 65. The amplified signal is inputed into a second thermistor 62, resistor 64 and capacitor 63 of the network 62A, which changes the phase of the amplified signal in a direction opposite to the phase shift of the first thermistor 58, resistor 59, and capacitor 60 of the network 58A, to compensate for the linear dimensional changes of the machine structure and spindle due to changes in the ambient temperature of the surroundings. The adjustable resistor 64 determines the amount of phase change for a certain resistance change in the thermistor 62. Therefore the output of the temperature compensator 45A is a differentially corrected sine wave whose phase has been shifted to compensate for a temperature rise in the operating temperature of a machine structure above the ambient temperature of the surroundings.

To set the temperature compensator 45A, the tap of the adjustable resistor 59 of the network 58A and the tap of the adjustable resistor 64 of the network 62A are set at their midpoints. Now the adjustment of resistor 59 will be made while the tap of resistor 64 remains at the midpoint. Spindle 28 is run at a low operating speed and the linear distance between the spindle 28 and a reference point located on a workpiece secured to the table is then measured. Thereafter, the spindle 28 is operated at a higher speed which will generate higher operating temperatures which, in turn, effects the thermal expansion of the spindle head and column structure. The ambient temperature of the surrounding will be kept constant during the setting of adjustable resistor 59. The distance between the spindle nose and the initial reference point located on the workpiece is now measured, and the adjustable resistor 59 will be adjusted accordingly. If it is found that the temperature compensator effects too much of a phase change in the control voltage coming from the position feedback unit 56, thereby causing the spindle to stop short of the desired position, the tap on the adjustable resistor 59 will be moved to put more resistance in. On the other hand, if it is found that the temperature compensator effects too little of a phase change in the control voltage coming from the position feedback unit 56, thereby causing the spindle to overtravel the desired position, the tap on the adjustable resistor will be moved to short out more resistance. By running the spindle 28 at its different speeds and by taking linear measurements between the spindle and some reference point, as described above, an optimum setting for the adjustable resistor 59 may be obtained.

Now the adjustment of resistor 64 will be made while the tap of resistor 59 remains at its optimum setting. Spindle 28 is run at a low operating speed with the ambient temperature being held constant. The linear distance between the spindle 28 and a reference point located on a workpiece secured to the table is then measured. Thereafter, the spindle 28 is operated at a higher speed which will generate a higher operating temperature as measured by thermistor 58. The ambient temperature will be raised, as measured by thermistor 62, an amount equal to the rise in operating temperatures. Thermistors 58 and 62 are identical thermistors. The distance between the spindle nose and the initial reference point located on the workpiece is now measured, and the adjustable resistor 64 will be adjusted accordingly. If it is found that the temperature compensator 45A effects too much of a phase change in the control voltage coming from the position feedback unit 56, thereby causing the spindle to stop short of the desired position, the tap on the adjustable resistor 64 will be moved to put more resistance in. On the other hand, if it is found that the temperature compensator 45A effects too little of a phase change in the control voltage coming from the position feedback unit 56, thereby causing the spindle to over travel the desired position, the tap on the adjustable resistor will be moved to short out more resistance. By running the spindle 28 at its different speeds and matching its associated operating temperature changes with corresponding changes in the ambient temperature and by taking linear measurements between the spindle and some reference point, as described above, an optimum setting for the adjustable resistor 64 may be obtained.

From the foregoing detailed description of the illustrative embodiment set forth herein to exemplify the present invention, it will be apparent that there has been provided an improved temperature compensator which utilizes a thermistor, impedance network to effect changes in the spindle positioning control circuit to compensate for dimensional changes of the machine structure due to operating temperature changes.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the claims. The principles of this invention having now been fully explained in connection with the foregoing description, we hereby claim as out invention:

We claim:

1. In a device for sensing and compensating for the thermal induced displacement of a movable component of a machine tool from a reference position;
   power means operably connected to activate said movable component in its movement;
   a positioning control system operably connected to supply a control signal to regulate the operation of said power means to effect accurate positioning of said movable component;
   a temperature compensation control selectively presettable to modify said control signal in response to a variation in temperature;
   an element in said temperature compensation control whose resistance changes with temperature, said element being disposed in said movable component and operable to change its resistance in response to changes in operating temperatures; and,
   means operably connected with said element and operating in combination therewith to modify the control signal to compensate for the displacement of the operating end of said positioning component of the machine tool from a reference point due to a variation in the operating temperature of the machine tool.

2. A device according to claim 1, wherein said element is a thermistor.

3. A device according to claim 2, wherein said temperature compensation control in response to a variation in the operating temperature in the movable component operates to provide a corrective phase shift of the control signal to compensate for the displacement of the operating end of said movable component of the machine tool due to the variation in the operating temperature of the machine tool.

4. A device according to claim 3, wherein said means is a reactive component.

5. A device according to claim 4, including:
   an adjustable resistor connected to said reactive component and operative to modify said control signal a predetermined amount in response to a resistance change in said thermistor.

6. In a device for sensing and compensating for the displacement of the operating end of a movable component of a machine tool from a reference position wherein such displacement is due to temperature variations;
    power means operably connected to activate said movable component within its movement;
    a positioning control system operably connected to supply a control signal to regulate the operation of said power means to effect accurate positioning of said movable component;
    a temperature sensing means connected to sense the variations in the operating temperature of the component of the machine tool and the ambient temperature of the surroundings and operable to produce a predetermined differential signal to modify the operation of said positioning control system;
    a plurality of elements in said temperature sensing means whose resistance changes with temperature, said elements being disposed in said machine tool and operable to change its resistance in response to changes in operating and ambient temperatures; and,
    means operably connected to each of said elements and operating in combination therewith to modify the control signal to compensate for the displacement of the operating end of said movable component of the machine tool from a reference point due to a variation in the operating temperature of the machine tool over the ambient temperature.

7. A device according to claim 6, wherein said elements are thermistors.